July 30, 1935. J. L. SHROYER 2,009,456
POWER TESTING DEVICE FOR AUTOMOBILES
Filed Dec. 31, 1927 5 Sheets-Sheet 2

Inventor:
Jacob L. Shroyer
by: Charles W. Hill
Attys.

July 30, 1935.  J. L. SHROYER  2,009,456
POWER TESTING DEVICE FOR AUTOMOBILES
Filed Dec. 31, 1927   5 Sheets-Sheet 3

Inventor:
Jacob L. Shroyer
by: Charles W. Hills
Attys.

July 30, 1935.   J. L. SHROYER   2,009,456
POWER TESTING DEVICE FOR AUTOMOBILES
Filed Dec. 31, 1927   5 Sheets-Sheet 4

Inventor:
Jacob L. Shroyer.

Patented July 30, 1935

2,009,456

UNITED STATES PATENT OFFICE 2,009,456

POWER TESTING DEVICE FOR AUTOMOBILES

Jacob L. Shroyer, Oak Park, Ill.

Application December 31, 1927, Serial No. 243,796

32 Claims. (Cl. 265—24)

This invention relates to an improved testing stand adapted for use in garages, filling stations, and the like, to afford a convenient means whereby an owner of an automobile may drive his car onto the testing device to determine the power developed by his automobile at a given speed by applying the driving power of his machine to the testing apparatus and reading the developed H. P. on a pressure gauge, which is calibrated in H. P. and so positioned that the face thereof may be readily seen from the driver's seat of the automobile.

It is an object of this invention to provide an improved testing platform for automobiles wherein a coin-controlled brake mechanism is operable by the driving wheels of a vehicle for automatically maintaining the driving speed of the automobile constant, and furthermore controls a pressure mechanism which, in turn, operates a pressure gauge which designates the developed horse power of the automobile being tested at the said constant speed.

It is also an object of this invention to provide an automobile testing stand upon which an automobile to be tested is driven to cause the rear wheels of the automobile to be positioned in driving contact with friction wheels to cause operation of a brake mechanism set for a predetermined speed and connected with a pressure-controlled ram mechanism, against which the automobile is pressed, to cause the actual H. P. being developed by the automobile at the predetermined speed to be conveniently read on a suitable gauge connected with the ram pressure mechanism.

It is an important object of this invention to provide an automobile testing stand for use in garages, filling stations, and the like, wherein an automobile is driven onto a stand, with the driving wheels in driving engagement with friction wheels forming a part of a brake mechanism, so that, when a coin is deposited in a coin control box and a lever is actuated, a pressure control mechanism is set in operation to serve as a bumper resistance to the driving power of the automobile, thereby causing the developed H. P. of the automobile, when driven at a constant speed maintained by the brake mechanism, to be read directly on a pressure gauge calibrated in H. P. and connected with said pressure control mechanism.

A still further object of the invention is to provide an automobile testing apparatus wherein the driving wheels of the test car actuate friction wheels forming part of a brake mechanism which maintains the driving speed of the automobile wheels constant and wherein the tendency of the car to advance is opposed by hydraulic means, the amount of the opposing force being indicative of the power developed by the automobile at the speed maintained by the brake mechanism.

Other and further important objects of this invention will be apparent from the disclosures in the specification and the accompanying drawings.

The accompanying drawings illustrate an embodiment of the present invention, and the views thereof are as follows.

As shown on the drawings.

The illustrated form of the improved testing device consists of a platform mechanism comprising in the present instance a pair of parallel I-beams or sills 1, which comprises a sub-structure upon which a plurality of transversely disposed inverted channel beams 2 are rigidly supported, to form a framework for a floor or platform 3. The platform 3 is provided near the entrance end thereof with a pivotally mounted trap door 4 adapted to be swung upwardly on hinges mounted longitudinally of the platform to permit access to be had to the mechanisms beneath the floor 3.

Rigidly secured upon the top of the floor or platform 3 are a pair of longitudinally disposed flanges or side boards 5 provided for the purpose of guiding an automobile onto the testing platform. The U-shaped ends of each of the transverse beams 2 have reinforcing plates 6 rigidly secured thereto. Rigidly secured transversely at one end of the floor or platform 3 is an inclined runway 7 to permit an automobile, designated as a whole by the reference numeral 8, to be run onto and off of the power testing device.

The platform might be flush with the floor or ground, in which event certain of the parts would be arranged within a pit.

The front bumper 9 of the automobile to be tested is moved into pressing contact with a ram plate 10 having apertured lugs 11 mounted on the rear face thereof and pivotally engaged on the vertical leg or post 12. The post 12 has a roller caster 13 mounted on the lower end thereof, with the roller tracking in a channel guide track 14 mounted longitudinally upon the top of the platform 3. The upper end of the post 12 is supported in a ram-head 15, which is rigidly secured on the outer end of a ram rod 16.

The ram rod 16 is slidably mounted within a ram cylinder 17 supported in a horizontal position by means of a metal framework 18 and by a panel or board 19, which is rigidly supported across the rear end of the platform 3. The lower portion of the panel 19 is provided with an opening through which the ram cylinder 17 projects. Mounted within the ram cylinder 17 and secured on the inner end of the ram rod 16 is a ram plunger 20. The ram plunger 20 is operated by a liquid pressure head within the ram cylinder 17 at the rear of the plunger. Connected to the outer end of the ram cylinder 17 is a standpipe 21, on the upper end of which a liquid reserve tank 22 is supported. Connected between the pressure tank 22 and the rear of the panel 19 is a brace bracket 23.

Figures 10, 11, 12:
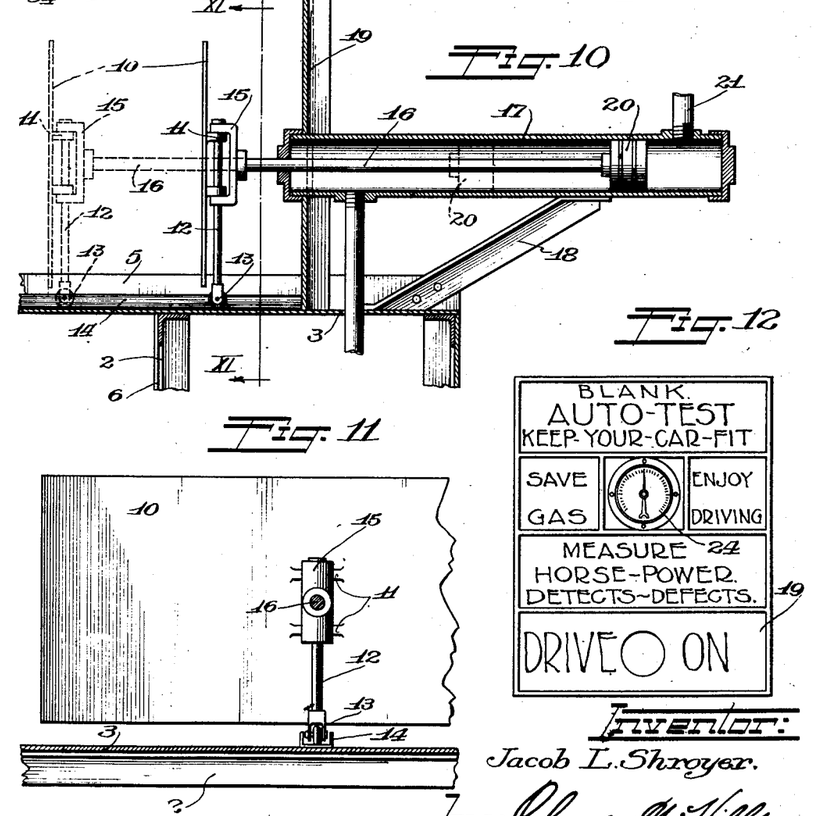
Figure 10 is an enlarged vertical section of the ram mechanism taken on line X—X of Figure 2, with parts broken away, and illustrating the operation of the ram head and rod in dotted lines.
Figure 11 is a fragmentary detail section taken on line XI—XI of Figure 10.
Figure 12 is a front elevational view of an advertising panel adapted to be mounted on a power board forming a part of the testing device.

The panel 19 is divided into a plurality of sections, as illustrated in Figure 12, with said sections having mounted or formed thereon advertising symbols or signs or other data. An opening is provided in the upper central portion of the panel 19 to receive a pressure gauge 24 which is calibrated in horse power.

A pipe 25 connects the pressure gauge 24 with the lower portion of the pressure standpipe 21. Connected in the standpipe 21 above the lower end of the pipe 25 is a main pressure control valve 26, which is moved into an open position by the action of the front wheels of the automobile as soon as the same advance onto the platform 3 as hereinafter more fully described, unless said valve is open. The main valve 26 is closed automatically when the rear wheels of the automobile contact with a pair of friction wheels 27 forming a part of the testing mechanism.

Figure 1:
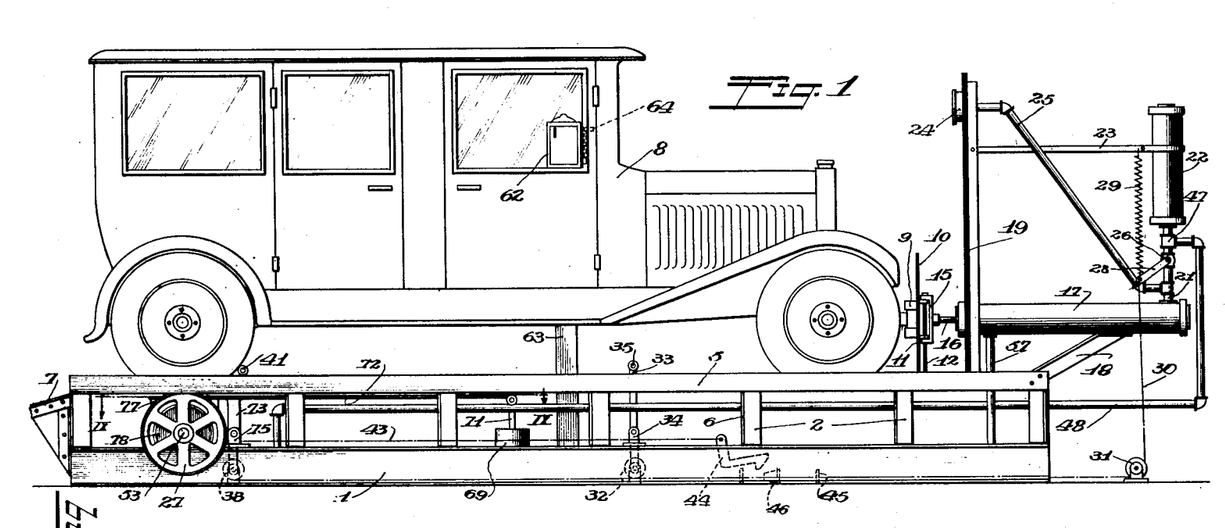
Figure 1 is a side elevation of a testing device for automobiles embodying the principles of this invention and illustrating an automobile in testing position.
Figure 2:
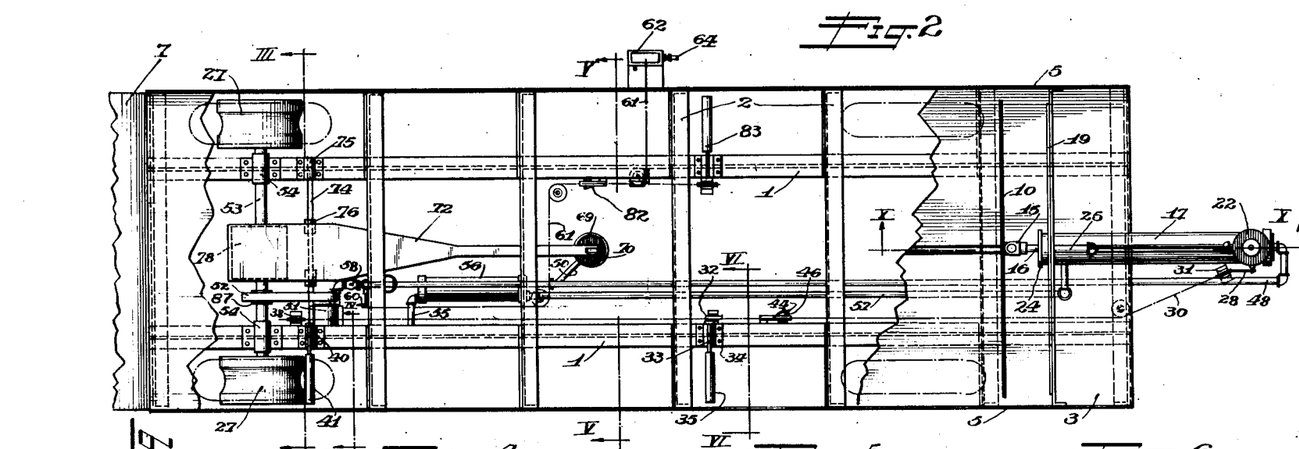
Figure 2 is a fragmentary top plan view of the testing device illustrated in Figure 1 with the automobile omitted and parts of the supporting floor broken away, to illustrate the brake control mechanisms.
Figure 3:
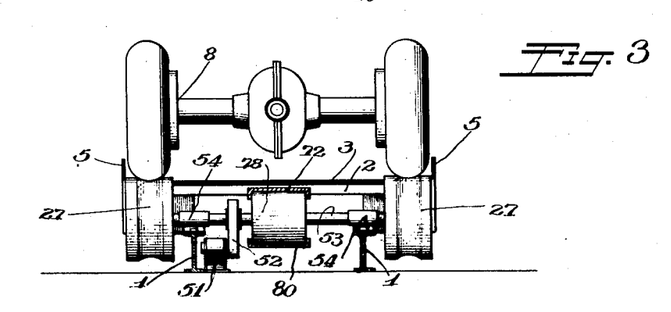
Figure 3 is a transverse section of the testing device illustrated in Figure 1 taken on line III—III of Figure 2, illustrating the rear driving wheels of an automobile in engagement with the friction wheels of the device.

Connected to the stem of the main valve 26 is a valve control lever or arm 28 to the outer end of which one end of a control spring 29 is attached. The other end of the control spring 29 is secured to the brace bracket 23 as illustrated in Figure 1. The control spring 29 acts to automatically close the valve 26 when the control handle 28 is released as hereinafter more fully described.

Also attached to the outer end of the valve control arm 28 is one end of a cable 30 which leads downwardly and is trained around a pulley wheel 31 supported on the floor beneath the valve handle 28 as illustrated in Figure 1. From the pulley wheel 31 the cable 30 leads rearwardly beneath the platform and is trained around a second pulley wheel 32 and then passes upwardly, with the end of said cable attached to the lower end of a secondary valve control lever 33 fulcrumed intermediate its ends upon a suitable bracket 34 attached to one of the I-beam sills 1.

Figure 6:
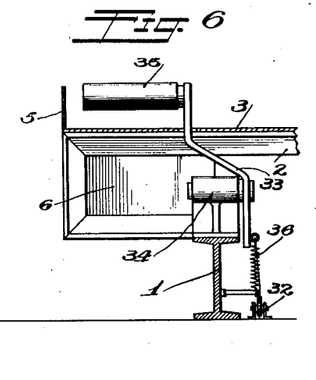
Figure 6 is an enlarged fragmentary transverse section of the secondary control mechanism for governing the pressure valve taken on line VI—VI of Figure 2.
Figure 7:
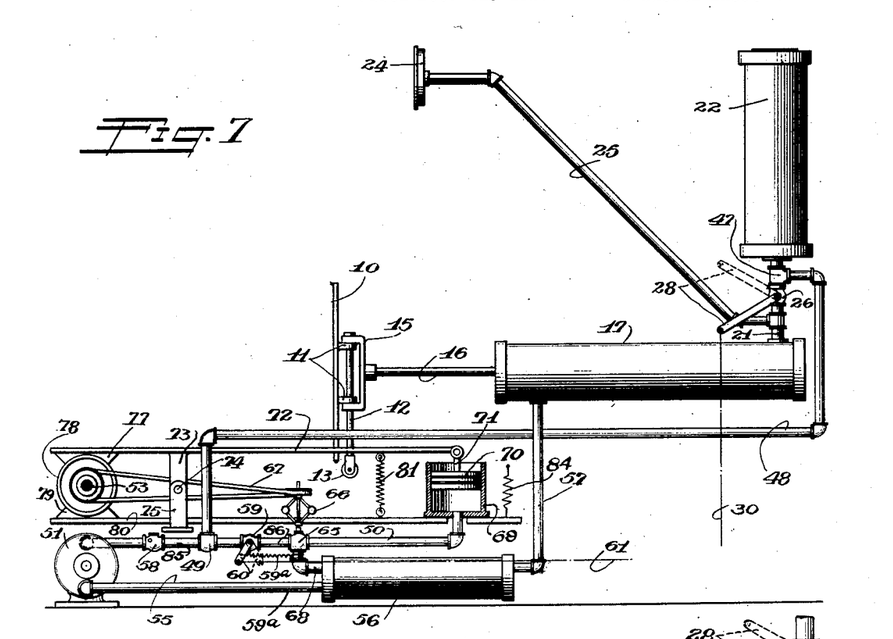
Figure 7 is a side elevation of the pressure system with parts of the platform omitted and with the various mechanisms closely related, to show the complete pressure system.

Rotatably supported on and at right angles to the upper end of the lever 33 is a roller 35 which is positioned above the platform 3 in the path of one of the front wheels of an automobile. Also attached to the lower end of the secondary valve control lever 33 is the upper end of a control spring 36, the lower end of which is secured to a pin fastened on the inner face of one of the sills 1, as illustrated in Figure 6 and which normally tends to maintain lever 33 in vertical position. Also attached to the lower end of the control lever 33 is one end of a cable 37, which extends downwardly and is trained around the pulley wheel 32 and around a pulley wheel 38 supported beneath the platform 3 inside of one of the sills 1 and near the rear end of the same.

Figure 4:
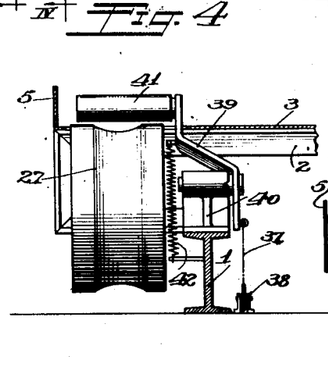
Figure 4 is an enlarged fragmentary transverse detail section of the primary control mechanism for the pressure control valve, said section being taken on line IV—IV of Figure 2.
Figure 5:
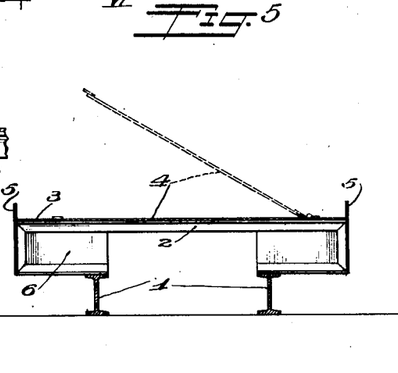
Figure 5 is a transverse section of the testing stand taken on line V—V of Figure 2, with parts omitted and illustrating in dotted lines the open position of a door permitting access to be had to the brake mechanisms of the testing device.

The cable 37 extends upwardly from the pulley wheel 38 and is attached to the lower end of a primary valve control lever 39 which is fulcrumed intermediate its ends on a bracket 40 supported by one of the sills 1. Rotatably supported at right angles on the upper end of the primary lever 39 is a roller 41 also positioned within the path of the wheels of an automobile driven onto the platform 3. Attached to the upper end of the primary lever 39 is the upper end of a control spring 42, the lower end of which is connected to a pin secured on the outer face of one of the sills 1 as illustrated in Figure 4. The lever 39 is so arranged on its support 40 as to have sufficient frictional engagement therewith when moved to vertical or D position as to be retained in such position until moved as hereinafter fully explained.

Figure 8:
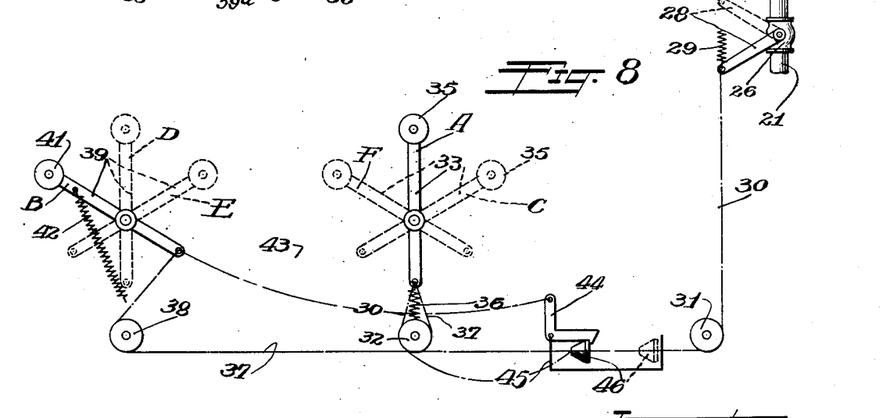
Figure 8 is a schematic view of the control mechanisms governing the pressure ram valve.
Figure 9:
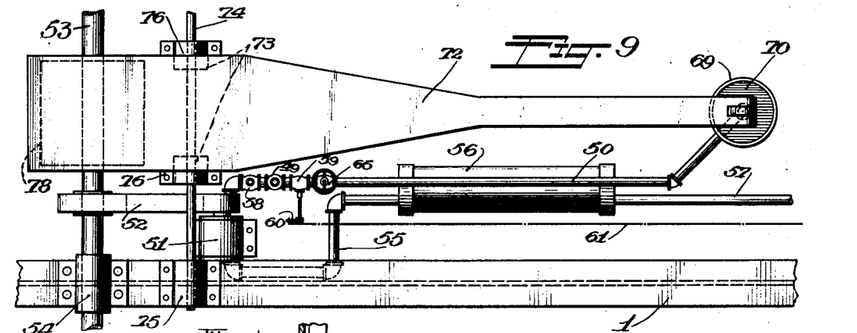
Figure 9 is a top plan view of the brake unit mechanisms taken on line IX—IX of Figure 1, with parts broken away.
Figures 13, 14:
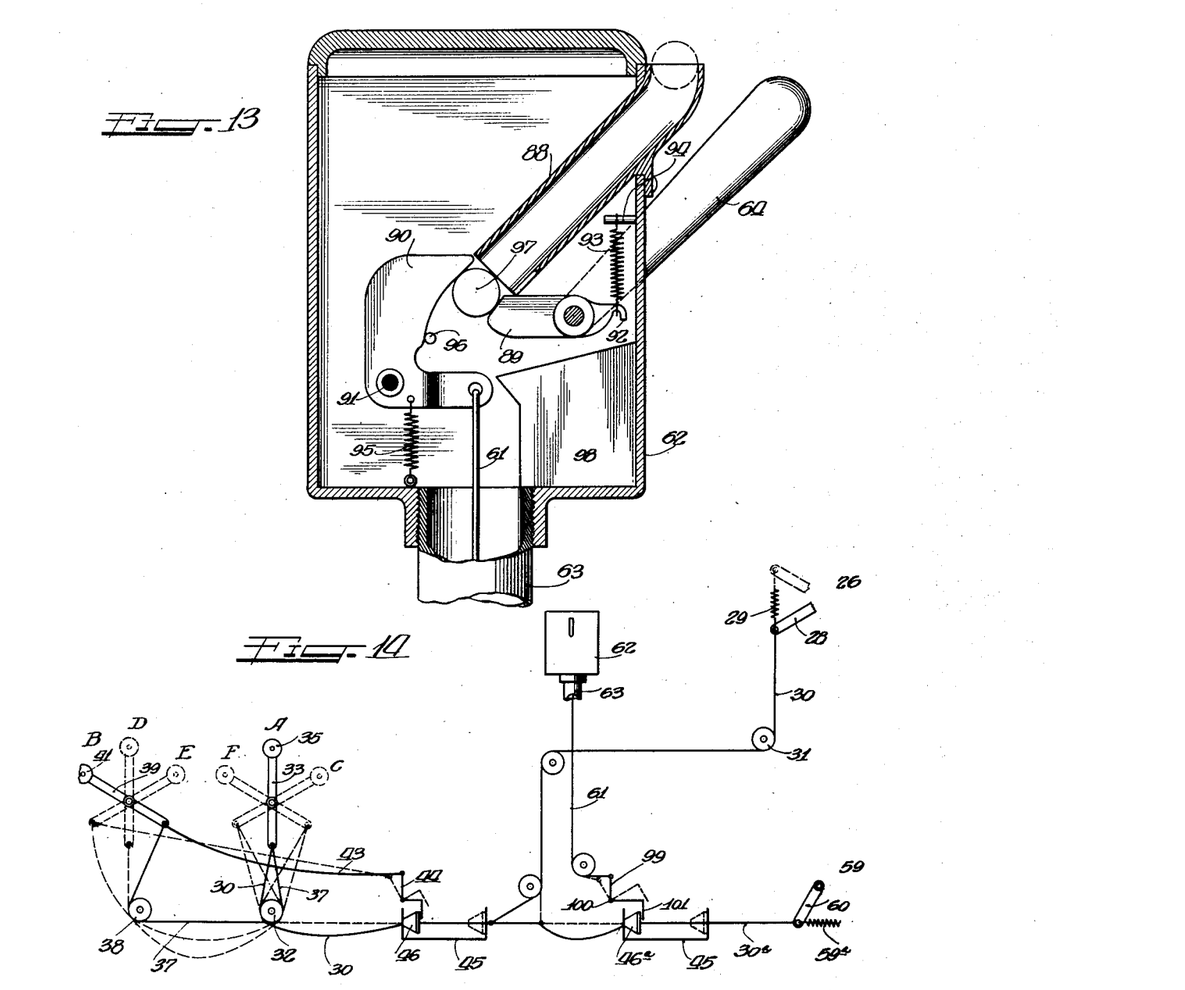
Figure 13 is an enlarged sectional view of a coin-controlled mechanism utilized in connection with the present invention.
Figure 14 is a schematic view of the control mechanisms for governing the actuation of the testing mechanism, and including the parts controlled by the coin-controlled mechanism.

Also attached to the lower end of the primary lever 39 is one end of a normally slack trip control cable 43, Figures 8 and 14, the other end of which is attached to one end of an angled trip or bell crank latch 44, which is pivotally supported at its angled portion upon one arm of a channel member 45 secured on the floor inside of one of the sills 1 which member 45 has apertures in the upwardly projecting flanges thereof through which the cable 30 passes. Secured on the cable 30 between the flanges of the channel member 45 is a tapered stop or block 46, adapted under certain conditions, to be engaged by the hooked end of the bell crank latch 44 to hold the valve handle 28 in its lowered position, thereby maintaining the main control valve 26 open.

The normal positions of the levers 33 and 39, when there is no automobile on the test platform, are designated by the letters "A" and "B" (Figures 8 and 14). When a car to be tested is driven onto the test platform, one of the front wheels of the car rides over the lever 39 in its normal or B position. The lever 39 in the B position is not moved as the front wheel of the car passes over the same. The wheel then engages the roller 35 of the secondary lever 33 swinging said lever from the normal or A position to the dotted line position C.

The shaft 53 is journaled in bearings 54 on the sills 1. The friction wheels 27 are fastened to the shaft 53 and drive said shaft. The friction wheels 27 have the peripheries thereof grooved to receive the tires of the driving wheels of a car to be tested, and project a slight distance above the surface of the platform for engagement by the wheels of the car.

Normally, i. e., with the levers 33 and 39 in normal or full line positions A and B respectively, of Figures 8 and 14, the cable 37 is taut, consequently swinging the lever 33 from the A position to the C position will move lever 39 from the B position to vertical position D. The lever 39 is retained in D position by reason of its frictional mounting in the bracket 40. The movement of the lever in the manner just described brings the roller 41 of this lever into the path of a rear wheel of the car. The secondary lever 33, however, does not remain in the C position, as, as soon as the front wheel of the car passes over the same, the spring 36 returns the lever to normal or A position, thus putting slack in the cable 37. The cable 43 which is slack when the lever 39 is in B position becomes substantially taut when the lever 39 is moved to D position. After the front wheel of the car has passed over the levers 39 and 33, both levers are in vertical position.

When a rear wheel of the car engages the primary lever in the B position, it is tilted to E position thereby rocking the bell crank trip 44 about its pivot and releasing the block 46 whereupon the spring 29 moves the lever 28 of the valve 26 from open to closed position. The bell crank 44 is tripped because the cable 43 becomes taut when the lever 39 is moved to the E position.

A pipe 48 extends from the standpipe 21 communicating with the pressure tank 22 to a T-union 49 in the pressure system. A pipe 85 having a check-valve 58 in it leads from the union 49 to the discharge of the centrifugal pump 51. A pipe 86 connects the other side of the union 49 with one way of a three-way valve 65 which is controlled by a governor 66. A pipe 50 of flexible material, such for instance as hose, leads from another way of the valve 65 to a cylinder 69. The centrifugal pump 51 is driven from the shaft 53 by means of a belt 52 from a pulley 87 on the shaft 53.

Connected to the intake of the centrifugal pump 51 is one end of a pipe 55 which at its other end communicates with a fluid supply and drain tank 56.

A pipe 57 has one end connected to the ram-cylinder 17 and the other end connected to the tank 56 so that should any leakage by the ram-cylinder occur then such leakage would return to the supply tank 56.

A check valve 58 is interposed in the pipe 85 between the T-union 49 and the outlet of the centrifugal pump 51 and arranged to prevent flow towards the pump outlet. This check valve serves to prevent fluid returning to the pump from the tank 22.

A valve 59 is interposed in the pipe 86 between the T-union 49 and the three-way valve 65. The valve 59 is provided with a handle 60 to which is attached one end of a branch cable 30a. A spring 59a is attached to the handle 60 and arranged to maintain the handle at normally closed position, and opposes movement of the handle by the cable 30a as hereinafter described.

A coin controlled box 62 is supported on a standard 63 at one side of the testing platform in a position to be conveniently reached by the driver of the car after the same has entered the platform for test purposes.

The coin box 62 is provided with a control lever or handle 64 for operation by the driver after a coin has been deposited in the box.

Any suitable form of coin control mechanism may be employed.

The coin controlled box herein illustrated is of simple form merely for the purpose of illustration.

A coin chute 88 is provided to receive a suitable coin, such as a quarter, and deliver the same between a thin extension arm 89 of the operating lever 64 and a plate 90 riveted at 91 to the coin box structure. The arm 89 is extended and provided with a hook 92 with which cooperates a spring 93 fastened to a pin 94 within the box which spring normally retains the handle 64 in upright position and the arm 89 in the position illustrated in Figure 13. A cable 61 is fastened to the plate 90 so that when the plate 90 is oscillated in counterclockwise direction as viewed in Figure 13, the cable 61 will be pulled upwardly, tripping the block 46a and allowing the spring 59a to open valve 59.

A spring 95 is fastened to the plate 90 for normally retaining it against a stop pin 96 which limits the movement of the plate in clockwise direction. The confronting surfaces of the arm 89 and plate 90 are such as to receive between them the coin 97 so that the coin becomes an element in the operating mechanism between the handle 64 and the cable 61. When the handle 64 is moved in clockwise direction, as viewed in Figure 13, the coin 97 will move the plate 90 in counterclockwise direction until the coin passes over the end of the arm 89 whereupon it will fall into a suitable receptacle 98 within the device 62 whereupon the springs 93 and 95 return the handle and plate to normal position ready to receive another coin for further operation.

The brake cylinder 69 is carried on one of the brake arms of the brake mechanism and as illustrated is fastened to the lower arm 80. Cylinder 69 is connected by the flexible conduit 50 to the three-way valve 65. A piston 70 is movable within the cylinder 69 and is provided with a plunger rod 71 to which is pivoted the upper brake arm 72. Cylinder 69 is movable with the lower brake arm 80. The brake arms 72 and 80 are connected by legs 73 and 75 extending toward each other where the ends of the legs are connected by a pivot 74 so that the arms rest upon the pivot as a center. The pivot 74 is suitably supported in the frame structure of the testing apparatus. A brake drum 78 is fastened to the shaft 53 and rotates with it. A brake shoe 77 is secured to the under side of the upper brake arm 72 and bears against the drum 78 while a similar shoe 79 is secured to the top side of the lower brake arm 80 and bears against the opposite side of the drum. The brake shoes 77 and 79 therefor engage the brake drum for braking purposes responsive to the pressure within the cylinder 69. A spring 84 is secured to one end of the lower brake arm 80 and has its other end fastened to a suitable part of the platform frame and serves to counterbalance the effect of the spring 81 which is connected between the brake arms 72 and 80 between the pivot 74 thereof and the cylinder 69. The spring 81 tends to draw together the arms thus tending to move the brake shoes 77 and 79 from engagement with the brake drum 78.

The governor 66 is driven by means of a belt 67 from the shaft 53 and, therefore, responds to the speed of shaft and to the friction wheels 27 which are in turn driven by the driving wheels of the car undergoing test.

When the parts are at rest, that is, when no car is on the platform, the valve 65 closes communication between the pump 51 and the brake cylinder 69 and opens communication between the brake cylinder 69 and the supply tank 56 so that after test any fluid within the cylinder 69 may drain back into the tank 56. The spring 81, after test is completed, tends to move the brake shoe 77 and 79 away from the brake drum 78 so that the friction wheels 27 are free to rotate.

Figure 14 represents schematically the levers 39 and 33, the coin box 62, the main valve 26, and the handle 60 of the valve 59.

Figure 8 illustrates the primary and secondary levers 39 and 33, the main valve 26, and the manner of releasing the block 46 from latched position to allow closing of the valve 26 by the spring 29.

Figure 14 illustrates the cable 30 as having a branch 30a which is connected to the lever arm 60 of the valve 59. A second block 46a is fastened to the cable 30a and moves between the upturned flanges of a member similar to the member 45 within which moves block 46.

A bell crank 99 is pivoted at 100 to a suitable part of the platform structure and has one end 101 arranged to engage the block 46a and its other end attached to the cable 61 of the coin control mechanism.

The full line figures in Figure 14 show the normal position of the part when the apparatus is ready for test, showing the primary and secondary levers in normal position and the block 46 and 46a in latched position as restrained by the bell cranks 44 and 99 respectively whereby the main valve 26 is retained open and the valve 59 closed. The dotted line positions of certain of the cables illustrate that under certain conditions portions of these cables are slack as will be more fully explained.

Figure 14 illustrates the normal position of the levers 33 and 39 and the latched position of the blocks 46 and 46a which have been moved into engagement with the bell cranks 44 and 99 respectively by the previously tested car in backing off of the platform. The movement of the block 46 from the dotted line position of Figure 14 to the full line position of Figure 14 draws the cable 30 to move the lever 28 of valve 26 to open position and also to move the lever arm 60 of valve 59 from open to closed position. With the parts in this condition, that is, with the primary lever 39 in B position and the secondary lever 33 in A position, the cable 37 is slack and that portion of the cable 30 between the secondary lever 33 and the block 46 is slack. There is also that portion of the branch cable 30a between the block 46a and its connection with the cable 30 which is slack.

The valve 26 is open and the valve 59 is closed. The governor controlled valve 65 is closed as between the centrifugal pump 51 and the cylinder 69 and open as between the cylinder 69 and the supply tank. Stopping the pump 51 and opening valve 26 allows fluid to enter the ram cylinder 17 and push out the ram 16 to the limit of its outward direction of movement ready to be engaged by the bumper of the next car to be tested.

The shaft 53 and its associated friction wheels 27 and brake drum 78 are at rest as is also the centrifugal pump 51.

This apparatus is useful in determining the power developed by an automobile at a given speed, which is determined as follows:

The friction wheels 27 are engaged by the driving wheels of the motor vehicle and the engine started with the high gear in mesh. The governor which has been set to allow the speed of the shaft 53 and the friction wheel 27 to speed up from zero to a maximum speed as determined by the governor which maximum speed represents a predetermined rate of speed for the driving wheels of the car. Suppose, for instance, that the predetermined rate of speed of the car for the test is 35 miles per hour which is the speed the driving wheels of the car would make if the car were on the road and with the necessary power of the engine developed to produce such speed. This then is the testing speed of the apparatus. The brake mechanism allows the shaft 53 to speed from zero up to this maximum speed, thereupon the braking effect is such as to maintain the speed of the friction wheel constant at this predetermined speed. In the present exemplification of the invention, the rotation of the automobile driving wheels on the friction wheels of the tester tends to impart forward motion to the car which is resisted by the ram 16. Thus effort, therefore, to advance may be translated into pressure in the ram cylinder and the pressure indicated directly on the gauge as horse-power.

The formula for horse power is pressure or power times the speed divided by 33,000. In this equation there is but one unknown quantity, to-wit, the pressure or power. The speed is known as it is fixed at 35 miles an hour by the governor, consequently, the gauge may be calibrated directly in horsepower as the pressure developed in the ram cylinder by the effort of the car to advance is the pressure desired in the formula and being the only unknown may be calibrated directly as horse power on the gauge as before mentioned. This, therefore, enables the operator of the car to ascertain the power of his engine at the particular moment necessary to operate the motor vehicle at a road speed of 35 miles per hour.

The operation of the testing apparatus is as follows:

The primary lever 39 is in B position, secondary lever 33 is in A position and cable 37 connecting these levers is taut. A front wheel rides over the roller 41 on the lever 39 without causing movement of this lever as the same rests against a portion of the frame preventing movement in counterclockwise direction. Continued movement of the vehicle onto the platform brings the front wheel into engagement with the roller 35 on lever 33 moving it from A position to C position. This movement thereupon moves the lever 39 from B position to D position because the cable 37 was taut. The lever 39 is retained in D position by frictional engagement with its pivotal member.

The spring 36 returns the lever 33 to A position, consequently, the cable 37 is slack. Continued movement of the car onto the platform then brings a rear wheel onto its friction wheel 27 and against the lever 39 in D position moving the lever 39 into E position. This movement of the lever 39 does nothing to lever 33 because the cable 37 is slack, however, the movement of the lever 39 from D to E moves the cable 43, which has moved from slack position to taut position when the lever 39 was in D position, to trip the bell crank 44 from engagement with the block 46, thereupon releasing the pull on the cable 30 allowing the spring 29 to close the valve 26, moving the lever 28 from full line to dotted line position of Figures 8 and 14.

Advancement of the car onto the platform moves the ram 16 inwardly of the cylinder 17 a slight extent and when the car has reached testing position the closing of the valve 26 thereupon fixes the free inward movement of the ram.

The driver of the vehicle thereupon deposits a coin in the coin box 62, pulls down the handle 64 causing the cable 61 to trip the bell crank 99 from engagement with the block 46a whereupon the spring 59a moves the handle 60 of the valve 59 from closed to open position, so that the outlet of the centrifugal pump 51 is now open between the pump and the three-way valve 65.

The primary lever 39 is now in the E position and the secondary lever 33 in the A position, cable 37, therefore, is taut between these two levers. The cable 30 between the lever and the block 46 is taut, likewise between the lever 33 and the block 46a.

The car is now in proper position on the apparatus to test the power necessary to operate the driving wheels thereof at a predetermined speed of 35 miles an hour, or at any predetermined speed at which the testing apparatus is set.

The operator thereupon meshes the high speed gears of the transmission and starts his motor whereupon the driving wheels of the car rotate in a forward direction tending to move the car forwardly against the ram 16.

Operation of the friction wheels 27 by the automobile wheels rotates the shaft 53, the brake drum 78 and the centrifugal pump 51. The governor 66 is also set in operation by rotation of shaft 53. The three-way valve 65 is closed as between the pump 51 and the tank 56 whereupon the pressure built up by the pump 51 causes flow of fluid from the tank 56 through the pump, through the check-valve 58, T-union 49, pipe 48, into the tank 22, filling it to capacity. Should, however, the speed of the apparatus not be up to maximum, continued rotation of the pump 51 will cause the impeller to rotate without delivering any more fluid into the tank 22 as this tank is filled. This condition prevails until the governor 66 actuates the three-way valve 65 opening fluid passage from the pump 51 to the cylinder 69 and closing passage between cylinder 69 and tank 56, whereupon fluid under pressure is admitted to the cylinder 69 moving the piston 70 in a direction to move the brake shoes 77 and 79 into braking engagement with the brake drum 78 thus retarding the speed of rotation of the shaft 53. The governor functions to admit fluid pressure to the cylinder 69 until maximum speed for which the apparatus is set is reached, whereupon the governor valve 65 is closed as to the pump and the brakes remain in position to maintain rotation of the shaft 53 and its associated parts at a constant speed which is that representing a predetermined rate of speed of the car wheels, which for instance, is 35 miles an hour.

The car wheels are operated at this constant speed tending to advance the car against the ram which ram in turn sets up pressure within the cylinder 17. Pressure set up within the cylinder 17 in the manner just stated is translated to the gauge 24 where indication is made of the developed pressure within cylinder 17.

Should the speed of the wheels rise above this predetermined maximum, then the governor 66 would open valve 65 sufficiently to admit fluid pressure to the cylinder 69, and should the speed fall below the predetermined maximum, the valve 65 would be operated to allow communication between the cylinder 69 and the tank 56 relieving pressure within the cylinder 69.

Thus it is possible to maintain the speed of rotation of the shaft 53 and its associated brake drum and friction wheels at substantially constant speed, which is predetermined by the setting of the governor 66 and the selection and design of the centrifugal pump 51.

The reading of the gauge 24 may be directly made in horse power for the reason as before stated.

The formula for horse power is pressure times speed divided by 33,000. The speed is known, to-wit, 35 miles per hour; 33,000 is constant. Consequently, the pressure developed in the ram cylinder 17 may be indicated directly as horse power on the gauge 24.

It is, of course, possible to calibrate the gauge 24 in other manners, such for instance as torque. However, in the present instance, it is calibrated as horse power.

An automobile tested on the apparatus of this invention indicates the power developed by the particular engine of the automobile necessary to operate the driving wheels of the automobile at a predetermined speed, to-wit, 35 miles per hour.

When the test is completed the high speed gears are unmeshed, whereupon the driving wheels and the friction wheels 27 come to rest, or if the operator so desires, he may put his gears in reverse and drive the car off of the platform. As long as the centrifugal pump is operating, and also as long as the governor is operating, there will be some pressure in the cylinder 69 which has been found sufficient to enable movement of the car from the platform, there being sufficient friction in the friction wheels for this purpose.

The automobile in moving off of the platform removes the rear wheels from the friction wheels 27 and from engagement with the primary lever 39 which is in the E position. A front wheel of the automobile encounters the lever 33 in the A position and moves it to the F position. Cable 37 in the meantime is taut because the lever 39 is in E position and the lever 33 in A position.

Consequently, movement of the lever 33 from A to F position moves the lever 39 from E to D position where the lever is held by frictional engagement with its support. Continued movement of the car off of the platform brings a front wheel in contact with the lever 39 in the D position, moving it to the normal or B position where it is retained by the springs 42.

Movement of the lever 33 from the A to the F position pulls the cable 30 and its branch 30a moving the blocks 46 and 46a into position to be latched by the detents 44 and 99 respectively. These detents are released ready for latching engagement with the steps or blocks 46 and 46a when the cable 43 is slackened by the lever 39 moving from B to D position, then to B position and the return to normal position of the plate 90 in the coin box 62 so that the blocks 46 and 46a are engaged with the detents 44 and 99, thus setting the apparatus for the next test.

Movement of the cable 30 and its branch 30a in the manner just recited, opens the valve 26 and closes the valve 59 so that the apparatus is ready for the next test.

Coin box 62 is ready for the insertion of the coin for the next test as the parts have been returned to full line position as in Figure 13 by means of the springs 93 and 95 as heretofore described.

A lever 83 is pivoted to the frame in position to be rocked by a front wheel of the vehicle on entering or leaving the platform. The lever 83 is connected by a cable 61 to the control arm 60 of the valve 59. When a vehicle leaves the platform, the lever 83 is rocked to close the valve 59.

It will be observed that the testing apparatus is so fashioned that the vehicle actuates certain valve mechanism whereby a test may be accomplished, whereby the apparatus is automatically reset for test after one car has been tested and driven off of the platform.

The present invention has been embodied in commercial structures for testing the power developed by automobiles operated at a predetermined speed and in such structures the gauges have been calibrated in horsepower, making the ascertainment of the necessary horse power developed a ready one.

Applicant has in co-pending applications, Serial Nos. 447,991, and 710,831, disclosed other forms of apparatus involving the generic idea of the present invention, but utilizing other instrumentalities and combinations for carrying out the basic idea.

Inasmuch as the apparatus disclosed in the co-pending applications operates in accordance with the same general principle, applicant has elected to include the generic claims in this application for Letters Patent.

The gist of the present invention resides in the provision of friction wheels driven by the driving wheels of an automobile undergoing test; a centrifugal pump driven from the friction wheel shaft in consonant with the speed thereof; brakes acting on said friction wheel shaft, and pressure responsive means connected to said pump and to said brake, whereby the action of the pump stabilizes the speed of the friction wheel and bucks the action of the brakes.

The invention has been described herein more or less precisely as to details, yet it is to be understood that the invention is not to be limited thereby, as changes may be made in the arrangement and proportion of parts, and equivalents may be substituted without departing from the spirit and scope of the invention.

I claim as my invention:

1. A power testing apparatus for automobiles and the like comprising in combination, a testing platform, a main driving shaft supported therebeneath, a pair of friction wheels secured on said shaft engageable and operable by the driving wheels of an automobile on said platform, a brake drum on said shaft, brake mechanism associated with said brake drum, a fluid pressure system, a pump connected in said system, means for driving said pump from said main shaft, a brake cylinder in said pressure system connected to actuate said brake mechanism, a brake control valve in said pressure system for controlling pressure supplied to said brake cylinder, a speed governor for controlling said last mentioned valve, means for operating said governor from said main driving shaft, a control valve in said pressure system, a coin-controlled mechanism connected with said last mentioned valve to open the same on deposit of a coin, a gauge connected with said pressure system, a ram cylinder connected in the pressure system, a ram in said ram cylinder, said ram being operable by an automobile to be tested on said platform, a main valve in said pressure system, said main valve having an operating lever, a spring connected to said lever, means for moving said lever a direction to close said main valve, a swinging lever on said platform in the path of the automobile wheels, connections between said swinging lever and said main valve operating lever, said connections maintaining said main valve normally in open position, said connections allowing movement of said main valve lever by said spring to closed position when said swinging lever is moved one direction by the automobile wheels on entering the platform, a stop in said connection, a trip lever engaging said stop and normally holding said connections to maintain said main valve open, a second swinging lever on said platform in the path of the automobile wheels, connections between said second lever and the trip, other connections between the first and second swinging levers, said levers effective to move said stop into engagement with said trip lever as the automobile leaves the platform.

2. An automobile testing device comprising in combination, a platform, a fluid pressure system, a gauge connected in said system, a ram cylinder in said pressure system, a ram movable in said cylinder, a main valve for controlling the admission to said ram cylinder, a brake mechanism operable by the driving wheels of an automobile driven on to said platform into engagement with said ram, a brake cylinder in said pressure system connected to actuate the brake mechanism, a brake control valve in said pressure system for controlling pressure supplied to said brake cylinder, a speed governor operable by the driving wheels of the automobile for controlling operation of the brake control valve, a lever mechanism projecting above said platform and operable by the wheels of the automobile, connections between said lever and said main valve, said connections normally maintaining said main valve in open position, a coin-controlled valve in said pressure system, a coin-controlled mechanism connected with said valve for opening said valve when a coin is deposited, and an auxiliary lever mechanism projecting above said platform and connected to said main valve and operable by one of the wheels of the automobile when it is backed off said platform to open said main valve.

3. An automobile power testing device including in combination, a testing platform, a pressure system connected therewith, a ram cylinder in said pressure system, a ram in said cylinder engageable by an automobile driven on said platform, a gauge connected with said ram cylinder, a main valve controlling admission to said ram cylinder, and means for operating said main valve by the wheels of the automobile to cause opening and closing of said valve at predetermined times, and a coin controlled mechanism connected for allowing operation of the apparatus when a coin is desposited.

4. An automobile power testing device, comprising a testing platform, a brake mechanism connected therewith including friction wheels adapted to be operated by the driving wheels of an automobile on a platform, a pressure system connected with said brake mechanism, a brake cylinder in said pressure system connected to actuate said brake mechanism, a brake control valve in said pressure system for controlling supply of pressure to said brake cylinder, a control valve in said pressure system, a coin controlled device operatively associated with said control valve, a ram cylinder connected with said pressure system, a ram in said ram cylinder disposed to be pushed against by an automobile being tested, a gauge connected in said pressure system for registering pressure developed in said system by the push of said automobile against said ram, a main valve in said pressure system, and means operated by the automobile for operating said main valve.

5. An automobile power testing device, comprising a testing platform, a pressure system connected therewith, a ram cylinder in said pressure system, a ram in said ram cylinder adapted to be engaged by the automobile under test, a brake mechanism including friction wheels engageable by the automobile wheels, a brake cylinder connected with said pressure system, said brake mechanism being operable by an automobile being tested on the platform, and a gauge mechanism connected with said pressure system to register the pressure developed in the ram cylinder by the pushing of the automobile thereagainst during test.

6. An automobile power testing device, comprising a testing platform to receive an automobile thereon, a pressure system connected therewith, a ram cylinder connected with said pressure system, a ram movable in said ram cylinder and adapted to be operated by an automobile on the platform, a gauge connected with said pressure system for indicating the pressure developed in the ram cylinder by the automobile acting against said ram, a main valve in said pressure system, means connected with said main valve and operated by the wheels of the automobile for causing said main valve to shut off said cylinder and gauge from said pressure system whereby the pressure developed in the ram cylinder by the automobile acting against said ram may be indicated on said gauge, a brake mechanism connected to said pressure system and including brake wheels operable by the driving wheels of the automobile, a speed governor controlled valve in said pressure system controlling pressure supply to said brake mechanism, a control valve in said pressure system adapted to be closed by means engageable by the automobile wheels when the automobile is backed off the platform and opened when desired.

7. An automobile power testing device, comprising a testing platform, a brake mechanism connected therewith and including frictional wheels adapted to be operated by the driving wheels of an automobile undergoing tests, a cylinder connected to said brake mechanism, a pressure system connected with said brake cylinder, a ram cylinder connected with said pressure system, a ram movable in said ram cylinder adapted to be moved inwardly in said cylinder by the driving force of the automobile while undergoing tests, and valves in said pressure system actuated by the movement of the automobile wheels onto and off of the platform for opening and closing said cylinders to the pressure system.

8. An automobile power testing device, comprising a testing platform adapted to receive an automobile to be tested, a brake mechanism including friction wheels adapted to be operated by the driving wheels of the automobile, a cylinder operatively connected to said brake mechanism, a pressure system connected with said brake cylinder, valves controlling movement through said pressure system, a gauge connected with said pressure system, and a ram cylinder connected with said pressure system, a ram in said ram cylinder adapted to be moved inwardly of the ram cylinder by the driving effort of the automobile undergoing tests for causing the gauge to indicate power developed by the automobile for urging the same forward during test.

9. An automobile power testing device, comprising a testing platform, a pressure system, a brake mechanism connected to said pressure system and including friction wheels adapted to be operated by the automobile undergoing test, a ram cylinder connected to said pressure system, a ram movable in said ram cylinder adapted to be operated against by the automobile, a gauge connected with said pressure system for indicating a pressure developed in the ram cylinder by the automobile undergoing test, a control valve mechanism in said pressure system, a main valve in said pressure system, a lever in the path of travel of the automobile, and connections between said lever and said main valve, said lever being actuated by the movement of the automobile onto and off of the platform for controlling said main valve.

10. An automobile power testing device comprising a testing platform, a pressure system connected therewith, a brake cylinder and a ram cylinder connected with said pressure system, a brake mechanism operable by said brake cylinder, a ram movable in said ram cylinder, said brake mechanism and said ram being operable by an automobile undergoing test on the platform, control valves in said pressure system governed by movement of the automobile onto and off of said platform, and a gauge connected with the pressure system for indicating pressure developed in said ram cylinder by the automobile undergoing test.

11. The combination with an automobile power testing platform, of a gauge, mechanisms operable by the automobile when on said platform to cause the developed power of the automobile at a given speed to be indicated on said gauge, and control valves connected with said mechanisms and actuated by movement of the automobile on to the platform to allow the operation thereof by the automobile being tested.

12. An automobile power testing device, comprising a brake mechanism, a pressure system, valves controlling the same, a ram cylinder connected with said pressure system, a ram movable in said ram cylinder, said valves and said ram adapted to be operated by an automobile being tested, and an indicating gauge connected with said pressure system adapted to register the force developed in the ram cylinder by the automobile when the same is driven to operate said brake mechanism and said ram.

13. An automobile power testing device, comprising a testing platform, a pressure system connected therewith, an indicating gauge connected with said pressure system, a ram cylinder in said pressure system, a ram in said ram cylinder adapted to be operated by an automobile being tested, a main valve in said pressure system, means for operating the same and controlled by the movement of the wheels of the automobile over said platform, a brake mechanism connected with said pressure system and including friction wheels engageable and operable by the driving wheels of the automobile, a speed governor-controlled valve in said pressure system, a valve in said pressure system, a lever on said platform in the path of the automobile wheels, connections between said lever and said last mentioned valve whereby said valve is closed by one of the wheels of the automobile when the automobile is backed off of the platform, and a control device connected with said last mentioned valve adapted to be operated to cause the last mentioned valve to be opened when an automobile is in testing position upon the platform.

14. An automobile power testing device, comprising a testing platform, a pressure system connected therewith, a ram cylinder connected with said pressure system, a ram in said ram cylinder adapted to be operated by the automobile on the testing platform, a control valve in said pressure system, a spring for holding said control valve in closed position to permit testing of the power developed by the automobile, lever mechanisms operable by the wheels of the automobile to cause closing of said control valve when the automobile is run on to the platform, a latch mechanism for holding said valve in open position, means for maintaining the speed of the automobile wheels at a constant rate while undergoing test, and an indicator connected with said pressure system adapted to indicate the effort developed by said automobile when acting against said ram at said constant speed.

15. The combination with an automobile power testing platform, of a ram mechanism positioned to be engaged by the automobile to be tested, a gauge connected with said ram mechanism to indicate the force exerted thereagainst by said automobile, friction wheels engageable by said automobile wheels, a brake mechanism associated with said friction wheels, said brake mechanism operable by the driving wheels of the automobile, and a speed governor acting automatically to maintain the driving speed of said driving wheels constant to permit the developed horsepower of the automobile at the speed at which the governor is set to be read on said gauge.

16. An automobile power testing mechanism including a platform, a pair of friction wheels having portions thereof projecting above said platform for supporting and co-acting with the automobile driving wheels, a yieldable abutment against which said automobile pushes when in testing position on said platform, and means associated with said abutment for indicating pressure applied thereto by said automobile when said automobile wheels rotate on said friction wheels.

17. An automobile testing apparatus including tester friction wheels driven by the drive wheels of the automobile, in combination with the tester wheels, a fluid pressure system, a centrifugal pump in said system positively driven from the tester wheels in such manner that any speed variation of the tester wheels causes corresponding variations of speed of the pump, brake mechanism acting on the tester wheels to allow said wheels to reach a predetermined speed and then to maintain said wheels at that speed, connections between said fluid pressure system and said brake mechanism including a governor controlled valve responsive to the speed of the tester wheels for regulating fluid pressure supply between said fluid pressure system and said brake mechanism to actuate said brake mechanism in the manner stated.

18. An automobile testing apparatus including tester friction wheels driven by the drive wheels of the automobile, in combination, a fluid pressure system, a centrifugal pump in said system positively driven from the tester wheels so that the pump speed varies with the tester wheel speed, a brake mechanism, said fluid pressure system and said pump being operatively associated with said brake mechanism to actuate the same to maintain the maximum speed of the tester wheels constant to represent a predetermined rate of speed of the automobile wheels.

19. An automobile testing apparatus including tester friction wheels driven by the drive wheels of the automobile, in combination, a fluid pressure system, a centrifugal pump in said system driven from the tester wheels, a brake mechanism, said fluid pressure system and said pump being operatively associated with said brake mechanism to actuate the same to maintain the maximum speed of the tester wheels constant to represent a predetermined rate of speed of the car wheels, and means for indicating the pressure developed in said system by said automobile while undergoing test.

20. An automobile testing apparatus including in combination, means actuated by the drive wheels of the automobile, a fluid pressure circuit, a pump in said circuit actuated by said first mentioned means, a governor actuated by said first mentioned means, a brake mechanism actuated by said fluid pressure circuit, a valve in said circuit controlled by said governor whereby on actuation of the drive wheels of the automobile said governor becomes effective to cause the brake mechanism to maintain the first mentioned means at constant speed after said first mentioned means have reached such speed, said fluid pressure circuit including means for opposing advance of the car undergoing test, and means for indicating pressure developed in said last mentioned portion by the pressure of the car thereagainst while undergoing test.

21. An automobile testing apparatus including in combination, means actuated by the drive wheels of an automobile while undergoing test, fluid pressure actuated means for exerting braking action on said first means to maintain the speed thereof substantially constant, a pump positively driven by said first means in such manner that any speed variation of said first means causes corresponding speed variation of the pump whereby the pressure created by said pump varies in accordance with the speed of said first means, said pump being operatively connected with said second means for regulating the braking action of said second means, and adjustable means for varying the fluid pressure created by said pump to maintain the speed of said first means constant at any determined rate, the pressure in said second means being built up by the speed of the first means to maintain the speed of the first means constant at the rate for which the third means is adjusted.

22. An automobile testing apparatus including in combination, means actuated by the drive wheels of an automobile while undergoing test, fluid pressure actuated means for exerting braking action on said first means, and means responsive to the speed of said first means for regulating the braking action of said second means, fluid pressure means operative to oppose tendency of the car to advance during the time that the driving wheels of the car actuate the tester wheels, and means for indicating the pressure developed in the last mentioned fluid pressure means.

23. An automobile tester including in combination, braking means, driving means, a centrifugal pump positively driven by said driving means, and means for maintaining a constant speed of said driving means, said means including pressure responsive means actuated by said pump and acting on said braking means whereby the braking means bucks the action of the pump so that the resistance of the braking means balances the torque of the driving means.

24. An automobile testing apparatus including tester friction wheels driven by the drive wheels of the automobile, in combination, a fluid pressure system, a centrifugal pump in said system positively driven by the friction wheels so that any speed variation of the wheels causes corresponding speed variation of the pump, a brake mechanism, said fluid pressure system and said pump being operatively associated with said brake mechanism to actuate the same to maintain the maximum speed of the tester wheels constant to represent a predetermined rate of speed of the automobile wheels, and means for indicating the torque delivered to the tester wheels while the automobile is undergoing test.

25. An automobile tester, including in combination, friction wheels adapted to be driven by the drive wheels of an automobile undergoing test, a shaft for said friction wheels, means for maintaining the speed of said friction wheels at a predetermined constant speed during test, said means including a centrifugal pump positively driven from said friction wheel shaft in such manner that variations in the speed of said shaft causes proportional variations in the speed of said pump, a brake drum on said shaft, brake shoes engaging opposite parts of said drum, brake arms carrying said shoes and being pivotally mounted so as to apply and release the shoes with respect to the drum, pressure responsive means actuated by said pump and operatively connected to said brake arms whereby the brake action bucks the action of the pump so that the resistance of the braking means balances the torque of the friction wheels.

26. An automobile tester, including in combination, friction wheels adapted to be driven by the drive wheels of an automobile undergoing test, a shaft for said friction wheels, means for maintaining the speed of said friction wheels at a predetermined constant speed during test, said means including a centrifugal pump positively driven from said friction wheel shaft in such manner that variations in the speed of said shaft causes proportional variations in the speed of said pump, a brake drum on said shaft, brake shoes engaging opposite parts of said drum, brake arms carrying said shoes and being pivotally mounted so as to apply and release the shoes with respect to the drum, pressure responsive means actuated by said pump and operatively connected to said brake arms whereby the brake action bucks the action of the pump so that the resistance of the braking means balances the torque of the friction wheels, and valve means for varying the fluid pressure for any given constant speed.

27. Apparatus for testing the mechanical effort of an automobile of the type wherein the automobile driving wheels rotate friction wheels of the tester apparatus, of means for maintaining the speed of said friction wheels constant at any given rate in order to ascertain the mechanical efforts developed at that rate, said means including fluid pressure brake means acting on said friction wheels, and a centrifugal pump positively driven by said friction wheels for creating pressure for said brake means, the driving connection of said friction wheels and said pump being such that any speed variation of the friction wheels causes a proportional speed variation of the pump and consequent variation of pump pressure, and means for adjusting the amount of fluid pressure delivered to the brake means by said pump to maintain the speed of said friction wheel constant at any desired rate.

28. An automobile tester including in combination, a shaft, brake drum on said shaft arranged to be driven by the wheels of the automobile undergoing test, brake shoes engaging said drum, arms carrying said brake shoes, and fluid pressure actuated means operatively associated with said arms and responsive to the speed of said drum for varying the braking effect of said brake shoes on said drum, said fluid pressure means including a centrifugal pump positively driven by the shaft, fluid pressure actuated means connected to one brake arm and communicating with said pump, said pump building up pressure in said last mentioned means by increased speed of said drum for varying the braking effect of said brake shoes to stabilize the speed of said drum and buck the action of the brakes.

29. Automobile testing apparatus including in combination, a fluid circuit, a shaft, a brake drum on said shaft driven by automobile wheels while undergoing test, a centrifugal pump in said fluid circuit positively driven from said shaft, brake means frictionally engaging said drum, and fluid pressure responsive means connected to said pump and to said brake means, said pump actuating said brake means by means of said fluid pressure responsive means to maintain the drum at substantially constant speed.

30. An automobile testing apparatus including in combination, a fluid system, a fluid supply therefor, a brake drum, brakes engaging said drum, fluid pressure responsive means for actuating said brakes, a centrifugal pump in said fluid system, a pressure line leading from said pump to said fluid pressure responsive means, and a valve for closing admission to said fluid pressure responsive means when rotation of said brake drum falls below a predetermined point.

31. An automobile testing apparatus including in combination, a shaft, friction wheels on said shaft to be driven by the automobile wheels while undergoing test, a brake drum on said shaft, brake shoes engaging said drum, fluid pressure actuated means for actuating said shoes responsive to the speed of said friction wheels for varying the braking effect of said brake shoes on said drum, said fluid pressure means including a centrifugal pump positively driven by the shaft, said fluid pressure actuated means communicating with said pump, said pump building up pressure in said fluid pressure actuated means by increased speed of said friction wheels for varying the braking effect of said brake shoes to stabilize the speed of said friction wheels and buck the action of the brake.

32. An automobile testing apparatus including in combination, a shaft, friction wheels on said shaft adapted to be driven by automobile wheels while undergoing test, a brake drum on said shaft, brake shoes engaging said drum, arms carrying said brake shoes, said arms being pivotally connected together, fluid pressure responsive means connecting said arms on the other side of the pivots thereof from said drum, a centrifugal pump positively driven by said shaft and operatively associated with said fluid pressure responsive means and responsive to the speed of said friction wheels for varying the braking effect of said shoes on said drum, said pump building up pressure in said fluid pressure responsive means by increased speed of said friction wheels for varying the braking effect of said brake shoes to stabilize the speed of said friction wheels and buck the action of the brake, and a valve for varying the amount of fluid under pressure delivered to said fluid pressure responsive means by said pump to change the stabilized speed of said friction wheels.

JACOB L. SHROYER.